W. C. TYLER.
TIRE MAKING STRUCTURE.
APPLICATION FILED MAR. 30, 1918.

1,298,124.

Patented Mar. 25, 1919.
2 SHEETS—SHEET 1.

Inventor
William C. Tyler,
By
Rogers, Kennedy & Campbell
Attorneys

W. C. TYLER.
TIRE MAKING STRUCTURE.
APPLICATION FILED MAR. 30, 1918.
1,298,124.
Patented Mar. 25, 1919.
2 SHEETS—SHEET 2.
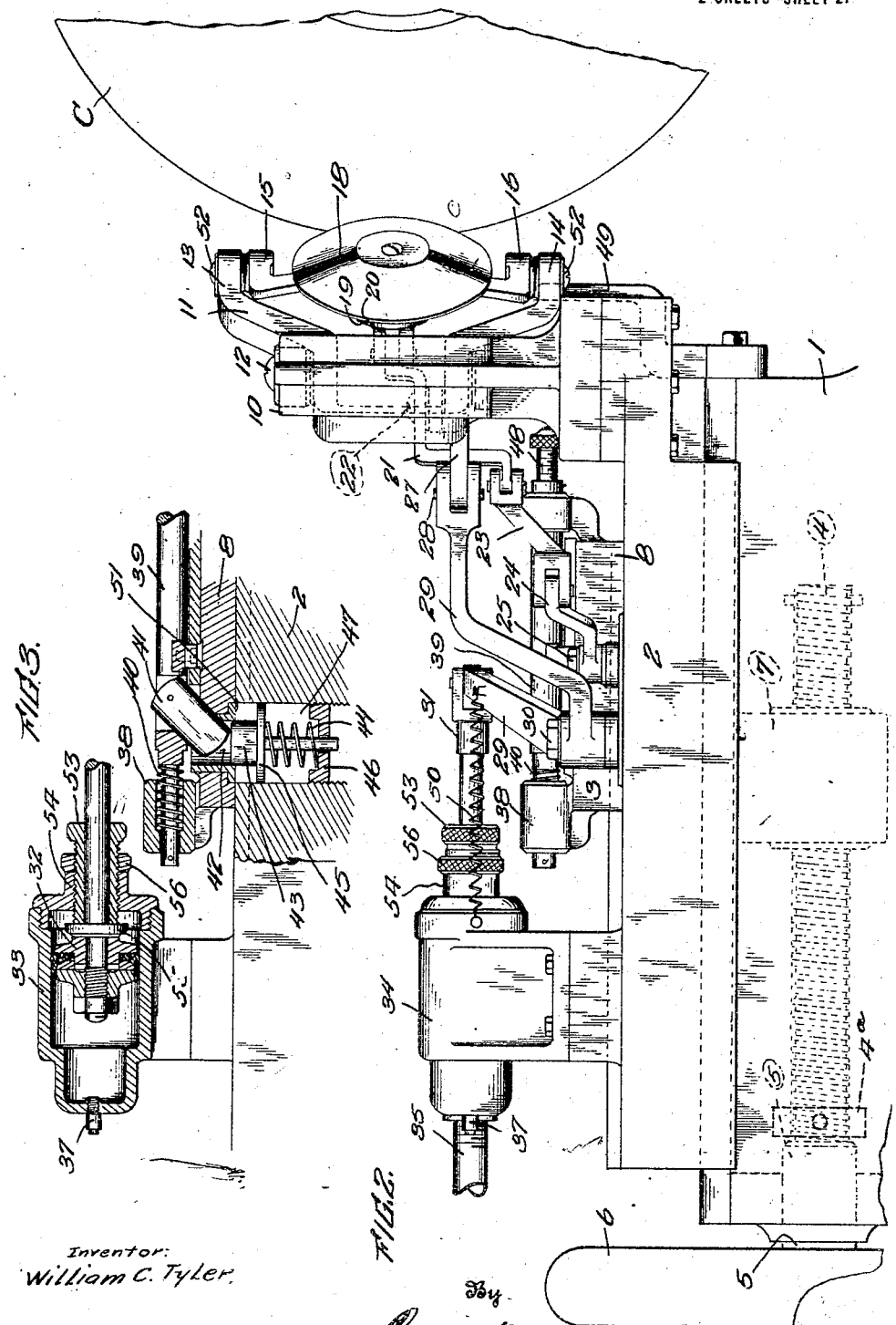
Inventor:
William C. Tyler.
By
Rogers, Kennedy & Campbell Attorneys

UNITED STATES PATENT OFFICE.

WILLIAM C. TYLER, OF RACINE, WISCONSIN, ASSIGNOR TO THE GOODYEAR TIRE & RUBBER COMPANY, OF AKRON, OHIO, A CORPORATION OF OHIO.

TIRE-MAKING STRUCTURE.

1,298,124. Specification of Letters Patent. Patented Mar. 25, 1919.

Application filed March 30, 1918. Serial No. 225,697.

*To all whom it may concern:*

Be it known that I, WILLIAM C. TYLER, a citizen of the United States, residing at Racine, in the county of Racine and State of Wisconsin, have invented certain new and useful Improvements in Tire-Making Structures, of which the following is a specification, reference being had therein to the accompanying drawing.

This invention relates to tire making structures and especially to machines for building the "carcass" (so-called) of pneumatic tires.

The primary object of the invention is to provide effective means for automatically changing the angularity of the fabric-stitching devices as the same traverse the curved surface of the fabric-covered core or mandrel.

A further object of the invention is to provide, in conjunction with this angularity-varying mechanism, an effective means for producing a yielding pressure of the stitching devices and, thereby, to maintain them in yielding engagement with the fabric-covered core.

Still another object within the contemplation of the invention is the provision of means for initially setting the stitching devices in engagement with the fabric-covered core so that, then, as the structure advances radially in reference to the core, certain mechanisms are automatically operated to effect a disconnection of two normally-connected, traveling instrumentalities and, thereupon, by reason of the relative movement between the two instrumentalities, accomplishing an automatic change of angularity of the stitching rolls progressively as they are moved about the curved surface of the fabric-covered core under the traveling action imparted to them by one of the two instrumentalities.

Other objects and advantages of the invention, inherent in the peculiar aggroupment of the several instrumentalities which constitute the machine, will be apparent, while others will be disclosed in the following description.

The invention resides, broadly, in the novel elements and the particular aggroupment thereof, all as will be hereinafter more fully set forth.

In the accompanying drawings, forming a part of this disclosure, I have exemplified a preferred embodiment of my invention, and in this connection it may be stated that these drawings are merely illustrative, since I contemplate modifications and variations which, however, are within the spirit of the invention and are not a departure from the underlying principles thereof.

In these drawings:

Fig. 2 is also a fragmentary view, in elevation, of the machine; and

Fig. 3 is a view in longitudinal section on the line 3—3, Fig. 1.

Figure 1:
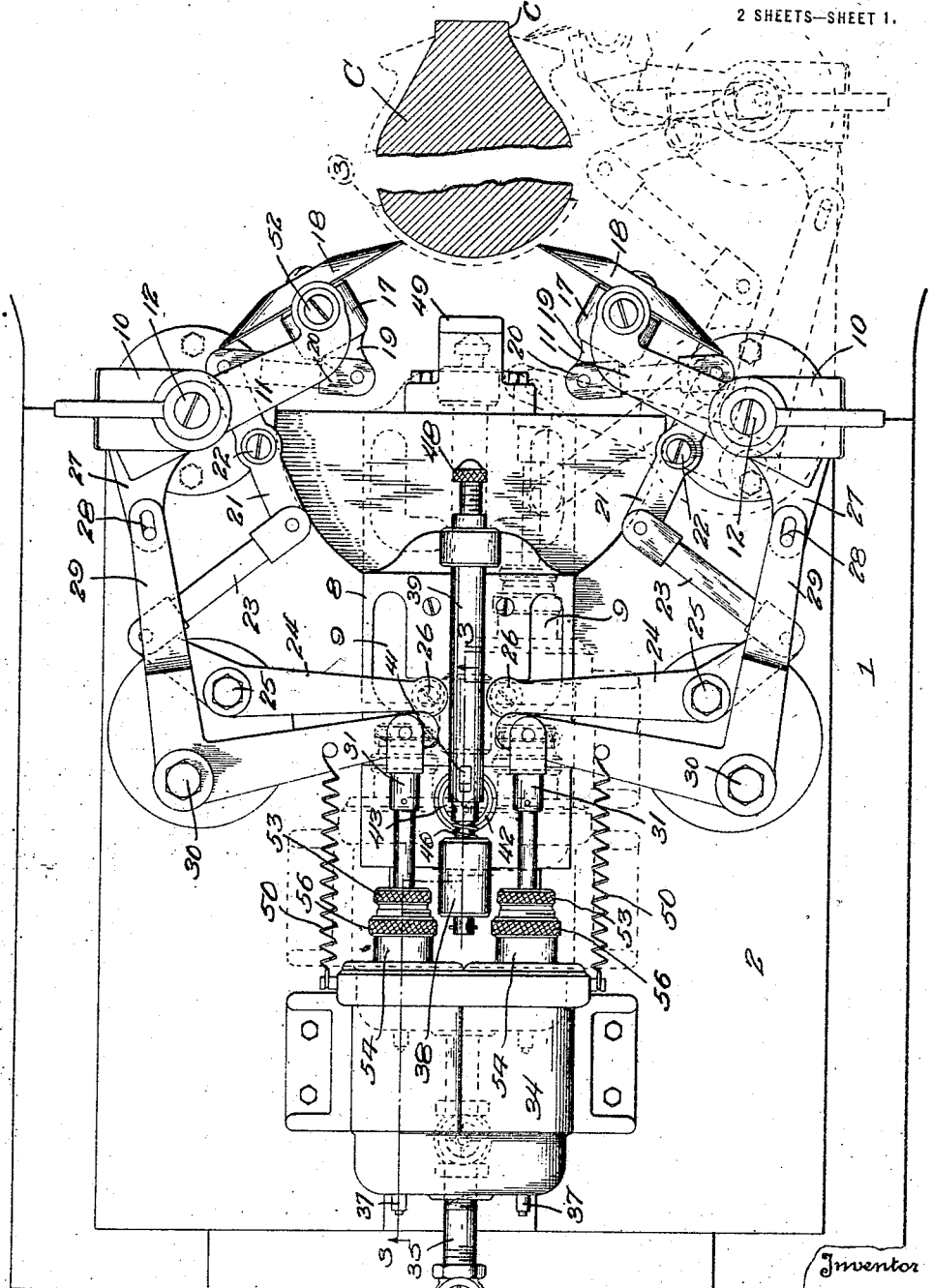
Figure 1 is a fragmentary view in plan of a tire-building machine constructed in accordance with my invention, certain of the devices thereof appearing in full lines to indicate a position which they occupy during operation of the machine and, in dotted lines, a different position which such parts assume as the machine is continued in operation.

Referring to these drawings, it will be noted that the reference-character 1 designates a base which, in this instance, is the upper portion of a so-called goose-neck or head of a well known type of tire-building machine. This constitutes the main support of a carriage 2, upon which the stitching mechanism (hereinafter to be described) is supported and by which it is progressively advanced toward a tire-core or form C, and on which is constructed a tire-carcass as indicated by 3 in dotted lines in Fig. 1.

Movement of the carriage 2 may be effected in any appropriate manner; but in the present instance I have shown such carriage-moving mechanism as comprising a feed-screw 4 threaded through a boss 5 formed in the goose-neck 1 and operated by a hand-wheel 6. The screw 4 works in a pendant screw-receiving boss 7 secured to the carriage 2. The screw is limited in its longitudinal movement toward the core C by the hand-wheel 6 abutting against the end of the base 1; and, in the opposite direction by a collar 4ᵃ pinned to the screw and adapted to abut against the boss 5. The base 1 is hollow or chambered centrally to permit free movement of the screw-receiving boss 7 so that the boss may move toward or away from the core C to advance the carriage 2 toward the same or to withdraw it therefrom.

Slidably supported, but normally connected to the carriage 2, is an angularity-changing member or slide 8 of relatively smaller dimensions (both lengthwise and widthwise) than the carriage. This slide is provided with two angulated slots 9, one portion of each slot extending longitudinally of the slide, while the other portion extends at an angle thereto, that is, transversely of the slide.

Upstanding from the carriage 2, at opposite corners of its front end, are standards or uprights 10 forming supports for stitcher-positioning arms 11. These arms 11 rotate on an axis indicated by 12 and comprise upper and lower members 13 and 14. Between these members extend connecting elements 15 and 16 which are attached to a common hub 17 which constitutes a bearing for a stitcher-roll 18 formed on a stitcher-carrying arm 19. Pivotally connected to the arm 19 is a link 20 and this in turn is pivotally connected to a lever 21 swinging on an axis 22 on the standard 10. Lever 21 is angulated, as shown in Fig. 2, and at its pendant end has pivoted to it a link 23. This link is jointed to one member of a bell-crank-lever 24, pivoted at 25 and which carries at its opposite end a roller 26 adapted to move in the angulated slot 9.

As already explained, each arm 11 operates on its respective axis 12 and is provided with an extension 27. Attached by a pin-and-slot connection 28 to this extension 27 is a bell-crank-lever 29 which swings on an axis 30 formed in the carriage 2. To the other member of the lever 29 is connected the outstanding end 31 forming an extension of a piston 32 which operates in a cylinder 33, there being a cylinder for each of the pistons connected to the levers 29, the two cylinders being formed in a cylinder casting 34. Pressure-fluid is introduced into the two cylinders through a pipe or conduit 35 which leads thereinto and which is controlled by a valve 36. Escape of pressure-fluid from the cylinders is allowed by an escape valve 37, and this permits the pressure-fluid to be discharged from the rear of the cylinder to allow the piston to return to normal position.

During a portion of the advancing movement of the stitching mechanism toward the core, the slide 8 is locked to the carriage 2. Then, at a predetermined point, the slide is unlocked therefrom so that it may remain at rest while the carriage continues its advancing travel. The locking of the slide to the carriage and its unlocking therefrom are automatically accomplished by the following mechanism. Mounted at the rear end of the slide 8 is a plunger-supporting member 38 in which is sustained a plunger 39. This plunger is normally maintained in a projected position by a spring 40 housed in the member 38. Pivoted in and depending from the plunger 39 is a latch 41 extending into a bushing 42 mounted in the slide 8 in alinement with the plunger 39. Normally projecting into the bushing 42 is a headed pin 43 acting under the influence of a spring 44 mounted between spring-holding pieces 45 and 46 in an opening 47 formed in the upper portion of the carriage 2. The plunger 39 carries at its opposite end an adjustable screw 48 adapted to impinge against an abutment or stop 49 mounted on and stationary with the gooseneck 1. By reason of the adjustability of the screw 48, the time of its engagement with the abutment 49, during the travel of the slide 8 and carriage 2, may be varied.

Operation: Assuming that a ply of tire-fabric has been properly laid about the surface of the tire-building core and is ready to be stitched down, the operator turns the hand-wheel 6 to advance the carriage radially toward the core C so as to position the stitching-rolls 18 into engagement therewith and into the position shown in full lines in Fig. 1. During this operation—and even for a period following it—the slide 8 is, by the headed pin 43, locked to the carriage 2 so that, under the action of the screw 4, both the carriage and the slide are given an advancing movement. It will be understood that, when the carriage and slide are in their starting position, the plunger 39 is in the position shown in full lines in Fig. 1, that is, in a position removed from the abutment 49. The stitching rolls 18 will have, thus, been positioned into engagement with the fabric-covered core. The carriage 2—and also the slide 8—being now in motion under the action of the feed-screw 4, turned by the operator, causes the stitching rolls 18 to move radially toward the axis of the core, the yielding action of the pressure-fluid in the cylinders 33 permitting these rolls to be moved outwardly or inwardly as they traverse the varying contour of the surface of the core, but remaining in engagement, under pressure, with the core. The pressure-fluid operates the bell-crank levers 29 in one direction and, at the same time, tensions springs 50 secured to each of the levers and also to the casting 34, these springs operating to effect a retracting movement of the bell-crank-levers.

When the carriage has moved a predetermined distance to position the stitching rolls in respect to a particular point on the surface of the fabric-covered core, the plunger 39 will have positioned the adjusting screw 48 into engagement with the abutment 49, whereupon the plunger 39 will be shifted rearwardly to compress its spring 40 and to rock its latch 41 against the headed pin 43 to depress the same and thereby move it out of engagement with the lower edge of the bushing 42. The slide 8 is, thus, released from the carriage 2 which, under the continuing rotation of the feed-screw 4, continues its advancing movement, the head of the pin 43 sliding along the under surfaces 51 of the bushing 42 and the slide 8. Up to this time, the rolls 26 on bell-crank-levers 24 have occupied positions in the transverse portions of the slots 9. When, however, the slide 8 comes to rest, after being released from the carriage 2, the rollers 26 move into the longitudinal portions of the slots 9, as shown in dotted lines in Fig. 1. Thereby, the bell-crank-levers 24 are caused to swing on their axes 25 and, through the links 23, levers 21, links 20, and arms 19, the hubs 17 are swung on axes defined by bolts 52 and, thus, the angularity of the stitching rolls 18 is progressively changed from that indicated in full lines in Fig. 1 to that indicated in dotted lines in the same figure.

The stitching rolls having accomplished their purpose of laying down the fabric on the core and having reached their limit of effective movement, the whole structure is returned to normal position by the operator reversing the direction of rotation of the hand-wheel 6. This retracts the carriage 2 until the pin 43 again enters its normal position in the bushing 42—the plunger 39 having also been moved away from the abutment 49—whereupon the slide 8 becomes again connected by the pin 43 to the carriage 2 and is thereby returned to its normal position. During the retracting movement of these parts, the pressure-fluid is released from the cylinders 33 by the valves 37, and this permits the stitching rolls to spread apart during their retracting movement. While the carriage is making its return movement independent of the slide 8, the rolls 26 are repositioned from the longitudinal portions of the slots 9 into the transverse portions thereof.

The parts having thus been restored to normal position, the machine is ready to operate again in the same manner to stitch down fabric upon the next ply positioned on the core.

This structure is particularly suited for stitching fabric upon a core after as well as before the beads are positioned thereon, and the automatic changing of the angularity of the stitching rolls is particularly desirable while the stitchers are traveling over the beads, and to the position shown in dotted lines in Fig. 1.

By reason of the fact that the screw 48 may be operated to change the time of its engagement with the abutment 49, as already stated, the time of unlocking of the slide 8 from the carriage 2 may be varied, at the will of the operator, and, thus, the particular instant when the change of angularity is to be initiated can be conveniently and with certainty accomplished.

To insure the proper initial positioning of the stitcher-rolls 18 with respect to the tread-portion of the core C, I provide means for limiting the movement of the pistons 32 within the cylinders 33: Such means preferably include an adjusting bushing 53 which surrounds the stem of the piston and is threaded into a collar 54 which is, itself, screwed into the cylinder 33. The inner end of the bushing 53 is adapted to be engaged by a circumferential enlargement 55 on the piston stem. The bushing is locked in position by the lock-nut 56. The inner end of this bushing serves as an adjustable stop for the piston: To set these stops, the carriage 2 is initially advanced forward toward the core C until the stitcher-rolls 18 are in a position beyond a point where they appear in dotted lines in Fig. 1, that is, on the tongue c of the core. Then each of the stop bushings 53 is screwed in until its inner end impinges against the enlargement 55, whereupon the bushing is locked by the nut 56. This is, of course, done in connection with both pistons. This initial setting of the parts serves to prevent the stitcher-rolls 18 from swinging to a position too near each other when the carriage is advancing and the stitcher-rolls are about to engage the core.

From the foregoing, it will be perceived that I have devised a tire-building structure which is well adapted to achieve the several objects and ends in view. The structure is simple and compact in form, is efficient in operation, and can conveniently be manipulated by a single operator. For the most part, it is automatic in action.

As many changes can be made in this construction and as many widely different embodiments of the invention may be made without departing from the spirit thereof, it is intended that all matter contained in the foregoing description and what is illustrated in the accompanying drawings shall be interpreted as illustrative and not in any limiting sense.

What I claim is:

1. A tire-building machine including a carriage, a traveling member normally connected to the carriage and automatically disconnectible therefrom, means for effecting relative movement between the carriage and the member, stitching mechanism traveling with the carriage, and means influenced by the traveling member for actuating said stitching mechanism.

2. A tire-building machine including a carriage, an angularity-changing member connectible to the carriage, means for imparting movement to the carriage and member together, means for disconnecting the carriage from the member to permit the carriage to continue its movement independent of the member, stitching mechanism supported on the carriage, and a connection between the stitching mechanism and the member whereby, when the latter is at rest, the angularity of the stitching mechanism is automatically varied.

3. A tire-building machine including a carriage, means for moving the same, stitching mechanism carried by the carriage, an angularity-changing member connectible to the carriage, means operating during the movement of the carriage for effecting a disconnection of the carriage from the member, and means operated while the member is at rest and during a continued movement of the carriage for actuating said stitching mechanism.

4. A tire-building machine including a carriage, an angularity-changing member connectible to the carriage and adapted to travel therewith for a portion of its movement, means acting during the travel of the carriage for effecting disconnection of the carriage from the member, stitching mechanism on the carriage and connecting with and operated by said member when the same is in a position of rest, and means for effecting movement of the carriage and member together and then for continuing movement of the carriage independent of the member.

5. A tire-building machine including a carriage having a to-and-fro movement, means for effecting such movement of the carriage, an angularity-changing member connectible to the carriage, stitching mechanism on the carriage, means interposed between the stitching mechanism and the member whereby when the member is in a condition of rest said means is operated to change the angularity of the stitching mechanism, means for automatically connecting the member to the carriage, and automatic means operated during the movement of the carriage to effect disconnection thereof from said member.

6. A tire-building machine including a carriage, a slidable member normally connected to the carriage, means interposed between the carriage and the member for connecting one to the other whereby both may move together, means operating at a predetermined point in the travel of the carriage for actuating said connecting means and thereby releasing the carriage from the member so that the latter may come to rest, stitching devices supported on the carriage, and mechanism interposed between said stitching devices and said member whereby when the latter comes to rest and while the carriage continues to travel said stitching devices are relatively actuated.

7. A tire-building machine including a carriage, a slotted member connectible to the carriage for movement therewith, means for effecting a to-and-fro movement of the carriage, means connected to said slotted member and automatically operated during the travel of the carriage to effect a disconnection between the carriage and the member, stitching devices supported on the carriage, and stitcher-actuating arms for connecting the stitching devices to said member whereby when the latter is at rest the stitching devices are given a relative movement while the carriage continues to move after being released from the member.

8. A tire-building machine including a carriage, means for effecting a to-and-fro movement thereof, a sliding member connectible to the carriage to move therewith, a locking mechanism interposed between the carriage and member for locking them together during a portion of the travel of the carriage, means operated during the travel of the carriage for actuating said locking mechanism to release the carriage from the member, stitching devices on the carriage adapted to have a swinging movement relatively, and connections between said stitching devices and said member whereby when the latter is released from the carriage and comes to rest said connections are operated to effect a swinging movement of the stitching devices.

9. A tire-building machine including a carriage, stitching devices mounted thereon and movable therewith, a slotted member superposed on the carriage and connectible therewith, a locking device interposed between the carriage and member for locking them together, means for effecting a to-and-fro movement of the carriage, means actuated during the traveling movement of the carriage for operating said locking device to permit the member to come to rest while the carriage continues its movement, connecting devices between the stitching devices and said member whereby when the latter comes to rest and the carriage continues its travel said stitching devices are moved to change their relative angularity, and means active on the stitching-devices for effecting a stitching operation thereof.

10. A tire-building machine including a carriage, a core juxtaposed thereto, means for effecting an advancing and receding movement of the carriage in relation to the core, stitching devices normally disengaged from the core but positionable into engagement therewith by the carriage, means for effecting movement of the carriage in relation to the core, an angularity-changing member connectible to the carriage, means for automatically releasing the carriage from the member at a predetermined point in the travel of the carriage whereby the member will come to rest and permit the carriage to advance independently thereof, and connections between the stitching devices and the member whereby during the continued travel of the carriage while the member is at rest said stitching devices are actuated to vary their angle with respect to the surface of the core.

11. A tire-building machine including a carriage, a tire-core juxtaposed thereto, means for effecting advancing and receding movement of the carriage in respect to the core, stitching devices mounted on the carriage and adapted to traverse fabric laid on the core, a sliding member connectible to the carriage and provided with a plurality of angulated slots, a locking device interposed between the carriage and the sliding member for connecting them together, a plunger connected to the locking device and movable with the carriage, an abutment arranged in the path of the plunger and adapted to move the same to operate said locking device whereby the carriage may be disconnected from the member, and connecting devices interposed between the stitching devices and the slotted member whereby when the same is at rest the angularity of the stitching devices is varied while the carriage continues to move toward the core independent of the slotted member.

12. A tire-building machine including a carriage, a tire-core juxtaposed thereto, means for effecting advancing and receding movement of the carriage in respect to the core, stitching devices mounted on the carriage and adapted to traverse fabric laid on the core, a sliding member connectible to the carriage and provided with a plurality of angulated slots, automatic means for connecting the member to the carriage during the travel of the same and including a locking device interposed between the carriage and the sliding member for connecting them together, a plunger connected to the locking device and movable with the carriage, an abutment arranged in the path of the plunger and adapted to move the same to operate said locking device whereby the carriage may be disconnected from the member, arms upon which said stitching devices are mounted, levers connecting with said arms, and means carried by the levers and working in the slots in the slidable member whereby when the same is at rest said levers are actuated to swing said arms and thereby change the angularity of the stitching devices with respect to the core.

13. A tire-building machine including a carriage, a tire-core juxtaposed thereto, means for effecting advancing and receding movement of the carriage in respect to the core, stitching devices mounted on the carriage and adapted to traverse fabric laid on the core, a sliding member connectible to the carriage and provided with a plurality of angulated slots, a locking device interposed between the carriage and the sliding member for connecting them together, a plunger connected to the locking device and movable with the carriage, an abutment arranged in the path of the plunger and adapted to move the same to operate said locking device whereby the carriage may be disconnected from the member, connecting devices interposed between the stitching devices and the slotted member whereby when the same is at rest the angularity of the stitching devices is varied while the carriage continues to move toward the core independent of the slotted member, and an adjustable device carried by the plunger whereby the time of engagement thereof with its abutment may be varied to change the moment of release of the carriage from said member.

14. A tire-building machine including a carriage, a traveling member normally connected to the carriage, means for automatically effecting active disconnection of the traveling member from the carriage to permit relative movement between the carriage and the member, stitching mechanism traveling with the carriage, means influenced by the traveling member for actuating said stitching mechanism, and pressure-fluid operated means connected to said stitching mechanism for also actuating the same.

15. A tire-building machine including a carriage, an angularity-changing member connectible to the carriage, means for imparting movement to the carriage and member together, means for automatically disconnecting the carriage from the member to permit the carriage to continue its movement independent of the member, stitching mechanism supported on the carriage, a connection between the stitching mechanism and the member whereby, when the latter is at rest, the angularity of the stitching mechanism is automatically varied, and pressure-fluid operated means connected to said stitching mechanism for also actuating the same.

16. A tire-building machine including a carriage, means for moving the same, stitching mechanism carried by the carriage, an angularity-changing member connectible to the carriage, automatic means operating during the movement of the carriage for effecting a disconnection of the carriage from the member whereby said member comes to rest, means operated while the member is at rest and during a continued movement of the carriage for actuating said stitching mechanism, and pressure-fluid operated means connected to said stitching mechanism for also actuating the same.

17. A tire-building machine including a carriage, an angularity-changing member normally connected to the carriage and adapted to travel therewith for a portion of its movement, automatic means acting during the travel of the carriage for effecting disconnection of the carriage from the member, stitching mechanism on the carriage and connecting with and operated by said member when the same is in a position of rest, means for effecting movement of the carriage and member together and then for continuing movement of the carriage independent of the member, and pressure-fluid operated means connected to said stitching mechanism for also actuating the same while the member is traveling with the carriage as well as when it is at rest.

18. A tire-building machine including a carriage having a to-and-fro movement, means for effecting such movement of the carriage, an angularity-changing member normally connected to the carriage, stitching mechanism on the carriage, means interposed between the stitching mechanism and the member whereby when the member is in a condition of rest said means is operated to change the angularity of the stitching mechanism, means for normally connecting the member to the carriage, automatic means operated during the movement of the carriage to effect disconnection thereof from said member, and pressure-fluid operated means connected to said stitching mechanism for also actuating the same while the member is traveling with the carriage as well as when it is at rest.

19. A tire-building machine including a carriage, a slidable member normally connected to the carriage, means interposed between the carriage and the member for connecting one to the other whereby both may move together, means operating at a predetermined point in the travel of the carriage for actuating said connecting means and thereby releasing the carriage from the member so that the latter may come to rest, stitching devices supported on the carriage, mechanism interposed between said stitching devices and said member whereby when the latter comes to rest and while the carriage continues to travel said stitching devices are relatively actuated, and pressure-fluid operated means connected to said stitching mechanism for also actuating the same while the member is at rest as well as when it is traveling with the carriage.

20. A tire-building machine including a carriage, a slotted member connectible to the carriage for movement therewith, means for effecting a to-and-fro movement of the carriage, means connected to said slotted member and operated during the travel of the carriage to effect a disconnection between the carriage and the member, stitching devices supported on the carriage, stitcher-actuating arms for connecting the stitching devices to said member whereby when the latter is at rest the stitching devices are given a relative movement while the carriage continues to move after being released from the member, and pressure-fluid operated means connected to said stitching mechanism for also actuating the same while the member is at rest as well as when it is traveling with the carriage.

21. A tire-building machine including a carriage, means for effecting a to-and-fro movement thereof, a sliding member connectible to the carriage to move therewith, locking mechanism interposed between the carriage and member for locking them together during a portion of the travel of the carriage, means operated during the travel of the carriage for actuating said locking mechanism to release the carriage from the member, stitching devices on the carriage adapted to have a swinging movement relatively, connections between said stitching devices and said member whereby when the latter is released from the carriage and comes to rest said connections are operated to effect a swinging movement of the stitching devices, and pressure-fluid operated means connected to said stitching mechanism for also actuating the same while the member is at rest as well as when it is traveling with the carriage.

22. A tire-building machine including a carriage, stitching devices mounted thereon and movable therewith, a slotted member superposed on the carriage and connectible therewith, a locking device interposed between the carriage and member for locking them together, means for effecting a to-and-fro movement of the carriage, means actuated during the traveling movement of the carriage for operating said locking device to permit the member to come to rest while the carriage continues its movement, connecting devices between the stitching devices and said member whereby when the latter comes to rest and the carriage continues its travel said stitching devices are moved to change their relative angularity, and pressure-fluid operated means connected to said stitching mechanism for also actuating the same while the member is at rest as well as when it is traveling with the carriage.

23. A tire-building machine including a carriage, a core juxtaposed thereto, means for effecting an advancing and receding movement of the carriage in relation to the core, stitching devices normally disengaged from the core but positionable into engagement therewith by the carriage, means for effecting movement of the carriage in relation to the core, an angularity-changing member connectible to the carriage, means for automatically releasing the carriage from the member at a predetermined point in the travel of the carriage whereby the member will come to rest and permit the carriage to advance independently thereof, connections between the stitching devices and the member whereby during the continued travel of the carriage while the member is at rest said stitching devices are actuated to vary their angle with respect to the surface of the core, and pressure-fluid operated means carried by the carriage and connected to the stitching devices for actuating the same while the member is at rest as well as when it is traveling with the carriage and thereby maintaining them in yielding engagement with the core.

24. A tire-building machine including a carriage, means for effecting to-and-fro movement thereof, stitching devices mounted on and carried by the carriage, supports for the stitching devices pivoted on the carriage, pressure-fluid devices on the carriage for actuating said supports, means for swinging the supports on their pivots to change the relative angle of the stitching devices, and a device automatically connectible to and disconnectible from the carriage and adapted to co-act with said swinging devices.

25. A tire-building machine including a carriage, means for effecting to-and-fro movement thereof, stitching devices mounted on and carried by the carriage, supports for the stitching devices pivoted on the carriage, pressure-fluid devices on the carriage for actuating said supports, means for swinging the supports on their pivots to change the relative angle of the stitching devices, a device automatically connectible to and disconnectible from the carriage and adapted to co-act with said swinging devices, and resilient means tensioned by the action of said pressure-fluid devices whereby the stitching devices may be restored to normal position.

26. A tire-building machine including a carriage, a tire-core juxtaposed thereto, stitching devices carried by the carriage and adapted to traverse the surface of the core, means for effecting movement of the carriage in relation to the core, first to position the stitching devices thereagainst and then to cause them to traverse its surface, pneumatic cylinders on the carriage, pistons operating in said cylinders, bell-crank-levers pivoted on the carriage and connected to the pistons and also to the stitching devices whereby the latter are maintained in yielding engagement with the core, springs connected to the levers for returning them to normal position and thus to reposition the stitching devices, a slotted member connectible to the carriage, levers engaging said member, arms interposed between said levers and the stitching devices for swinging the latter in respect to the surface of the core, and means for automatically disconnecting the carriage from the member whereby the latter may come to rest to actuate the levers engaged thereby.

27. A tire-building machine including a carriage, means for moving the same, stitching mechanism on the carriage, an angularity-changing device connectible to the carriage, means for effecting a disconnection of the carriage from the device to render the latter active on the stitching mechanism to change its relative angularity, the carriage in the interim continuing its travel, and means independent of the device for operating the stitching-mechanism for its stitching action.

28. A tire-building machine including a tire-forming core, a carriage movable in relation thereto, stitching mechanism on the carriage, pressure-fluid operated devices for actuating the stitching-mechanism independently of the movement of the carriage and including a pressure-cylinder and a piston working therein, and means for initially adjusting the extent of action of the piston in its cylinder whereby a variable operating movement of the piston and, thus, of the stitching-mechanism independent of the travel of the carriage is effected.

29. A tire-building machine including a carriage having a to-and-fro movement, stitching-devices movable on the carriage, pressure-fluid operated mechanism for actuating the stitcher-devices, and means active on the fluid-operated mechanism for varying the extent of a positioning movement of the stitching-mechanism independently of the travel of the carriage.

30. A tire-building machine including a carriage having a to-and-fro movement, stitching-devices movable on the carriage, pressure-fluid operated mechanism for actuating the stitcher-devices, means active on the fluid-operated mechanism for adjusting the extent of action thereof, and an angularity-changing mechanism made active during the travel of the carriage for moving the stitching-devices independent of their action by the pressure-fluid operated mechanism.

In testimony whereof, I have affixed my signature in presence of two witnesses.

WILLIAM C. TYLER.

Witnesses:
 WILLIAM W. STORMS,
 EDITH H. STORMS.